US006457063B1

(12) United States Patent
Chintalapati et al.

(10) Patent No.: US 6,457,063 B1
(45) Date of Patent: Sep. 24, 2002

(54) METHOD, APPARATUS & COMPUTER PROGRAM PRODUCT FOR DYNAMIC ADMINISTRATION, MANAGEMENT AND MONITORING OF DAEMON PROCESSES

(75) Inventors: Murthy V. R. Chintalapati, Mountain View; Robbe D. Mellencamp, Atherton, both of CA (US)

(73) Assignee: Sun Microsystems, Inc., Mountain View, CA (US)

( * ) Notice: Subject to any disclaimer, the term of this patent is extended or adjusted under 35 U.S.C. 154(b) by 0 days.

(21) Appl. No.: 09/070,494

(22) Filed: Apr. 30, 1998

(51) Int. Cl.$^7$ .............................. G06F 9/44; G06F 9/00; G06F 15/16; G06F 15/173
(52) U.S. Cl. ...................... 709/317; 709/104; 709/202; 709/316; 709/229; 709/224
(58) Field of Search ................................ 709/202, 317, 709/316, 229, 104, 224

(56) References Cited

U.S. PATENT DOCUMENTS

| | | | | |
|---|---|---|---|---|
| 5,109,486 A | * | 4/1992 | Seymour | 709/220 |
| 5,133,075 A | * | 7/1992 | Risch | 706/53 |
| 5,442,791 A | * | 8/1995 | Wrabetz et al. | 709/202 |
| 5,768,523 A | * | 6/1998 | Schmidt | 709/104 |
| 5,768,524 A | * | 6/1998 | Schmidt | 709/104 |
| 5,781,736 A | * | 7/1998 | Schmidt | 709/224 |
| 5,781,737 A | * | 7/1998 | Schmidt | 709/217 |
| 5,793,977 A | * | 8/1998 | Schmidt | 709/224 |
| 5,796,633 A | * | 8/1998 | Burgess et al. | 702/187 |
| 5,857,076 A | * | 1/1999 | Schmidt | 709/224 |
| 5,933,604 A | * | 8/1999 | Inakoshi | 709/226 |
| 6,029,175 A | * | 2/2000 | Chow et al. | 707/10 |
| 6,081,826 A | * | 6/2000 | Masuoka et al. | 709/100 |

OTHER PUBLICATIONS

Stallings, William. "SNMP, SNMPv2, and RMON" 1996.*
Dannenberg, Roger et al. "A Butler Process for Resource Sharing on Spice Machines". ACMTransactions on Office Information Systems, vol. 3, No. 3, Jul. 1985. pp. 239–252.*
Stallings, William. "SNMP, SNMPv2, and RMON" Addison Wesley, 1996, pp. 27–48.*
Berners–Lee et al., "Hypertext Transfer Protocol—HTTP/1.0," HTTP/1.0. 1–60 (1996).
Case, J. et al., "A Simple Network Management Protocol (SNMP)," Internet address: http://www.roxen.com/rfc/rfc1157.html. 1–21 (1990).
Cornell, G. and Horstmann, C.S., "Remote Objects," *Core Java 2nd ed.* Mountain View: Sun Microsystems Press 643–681 (1997).
Fielding, R. et al., "Hypertext Transfer Protocol—HTTP/1.1," Internet address: http://www.roxen.com/rfc/rfc2068.html. 1–106 (1997).

(List continued on next page.)

Primary Examiner—St. John Courtenay, III
Assistant Examiner—Lewis A. Bullock, Jr.
(74) Attorney, Agent, or Firm—Hickman Palermo Truong & Becker LLP (57) ABSTRACT

Apparatus, methods and computer program products are disclosed that allow for dynamic administration, management and monitoring of daemon programs executing within a computer. The invention uses service agent programs to communicate with a daemon program that provides services for a resource. The daemon program responds to administrative messages from the service agent. The service agent program uses these administrative messages to interact with the daemon program to perform administrative operations on the daemon program or the resources served by the daemon program without requiring the daemon program to be terminated and restarted.

30 Claims, 8 Drawing Sheets

OTHER PUBLICATIONS

"In.FTPD, FTPD—File Transfer Protocol," *Sun Microsystems, Inc. Maintenance Commands Listing*. 1–12 (1997).

"Linux System Administrator's Survival Guide lsg39.htm," Internet address: reference@earthweb.com. Macmillan Computer Publishing Chapter 39 (1998).

"Mail service Software Terminology," *AnswerBook2 ● Mail Administration Guide. Sun Microsystems, Inc.* 1–9 (1998).

McCloghrie, K. et al., "Definitions of Managed Objects for Administration of SNMP Parties," Internet address: http://www.roxen.com/rfc/rfc1353.html. 1–17 (1992).

"RPC—Library Routines for Remote Procedure Calls," *Sun Microsystems, Inc. Network Functions*. 1–9 (1996).

"Sendmail—Send Mail over the Internet," *Sun Microsystems, Inc. Maintenance Commands*. 1–14 (1996).

"SLAPD—Sun Directory Server Daemon," *Sun Microsystems, Inc. Maintenance Procedures*. 1–2 (1997).

Stevens, R.W., "Advanced Interprocess Communication," *Advanced Programming in the UNIX Environment*. Massachusetts: Addison–Wesley Publishing Company 475–503 (1992).

Stevens, R.W., "Interprocess Communication," *Advanced Programming in the UNIX Environment*. Massachusetts: Addison–Wesley Publishing Company 427–474 (1992).

Stevens, R.W., "Remote Procedure Calls," *UNIX Network Programming*. New Jersey: PTR Prentice Hall 692–700 (1990).

Stevens, R.W., "TCP/IP—The Internet Protocols" *UNIX Network Programming*. New Jersey: PTR Prentice Hall 198–213 (1990).

"Syslogd—Log System Messages" *Sun Microsystems, Inc. Maintenance Commands*. 1–3 (1997).

Tanenbaum, A.S., "Electronic Mail," *Computer Networks*. 3rd ed. New Jersey: Prentice Hall PTR 643–669 (1996).

Tanenbaum, A.S., "Usenet News," *Computer Networks* 3rd ed. New Jersey: Prentice Hall PTR 669–680 (1996).

* cited by examiner

METHOD, APPARATUS & COMPUTER PROGRAM PRODUCT FOR DYNAMIC ADMINISTRATION, MANAGEMENT AND MONITORING OF DAEMON PROCESSES

BACKGROUND OF THE INVENTION

1. Field of the Invention

This invention relates to the field of computer server program administration. Specifically, this invention is a method, apparatus and computer program product for dynamic administration, management and monitoring of daemon programs executing within a computer.

2. Background

Most computer operating systems include a mechanism for executing server programs. These server-programs are used to provide services to other, possibly networked, client-programs. These server-programs generally do not interact with a user. Instead, a client-program requests the server-program to perform an operation. The server-program performs the requested operation and generally returns a result to the client-program. These server-programs are commonly referred to as "daemon" programs and are subsequently defined. The daemon program is often invoked when the operating system initializes. When the daemon program starts execution, it may access command line options and/or read a preference or initialization file to further configure its operation. Daemon programs often provide services that are similar to operating system services. One example of a daemon program is a program that provides file opening and closing services for file resources. Another example of a daemon program is an HTTP server program that provides World Wide Web (WWW) page services for web page resources over the Internet.

Figure 1A:
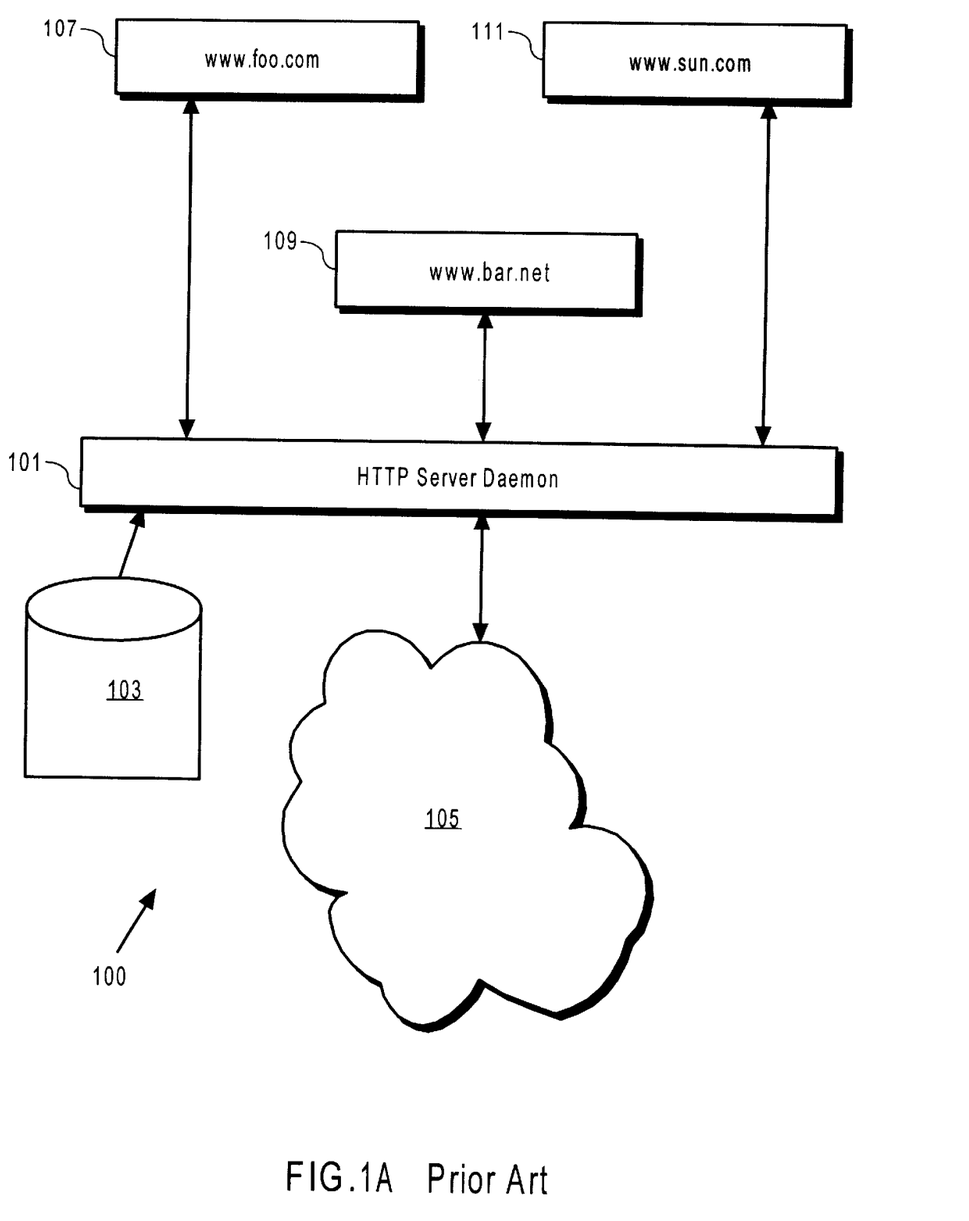
FIG. 1A illustrates a prior art daemon architecture.

FIG. 1A illustrates a prior art daemon architecture, indicated by general reference character 100, for providing services for one or more resources. This example uses an HTTP server daemon program 101 within the prior art daemon architecture 100. The HTTP server daemon program 101 accesses a preference file 103 to obtain information about the resources that it serves. The prior art daemon architecture 100 also includes a connection to a network 105. The communication through the network may be, but need not be, totally contained within the computer hosting the HTTP server daemon program 101. The HTTP server daemon program 101 provides service for multiple WWW domains. These include a first served web site 107, a second served web site 109 and a third served web site 111. In this example, each of the WWW domains is a resource served by the HTTP server daemon program 101.

One problem with prior art daemon programs is that they are generally designed to begin execution soon after the computer's operating system is booted and to continue execution until the computer is shutdown. Thus, if the operating characteristics for the daemon program change from the characteristics specified when the daemon program initiated, the daemon program must be terminated and restarted with the new characteristics. Between the time the daemon program terminates and the time the restarted daemon program is initialized, the service provided by the daemon program is unavailable. Thus, performing administrative functions on the daemon program effects the availability of the services for the resources provided by the daemon program. Such administrative functions include (without limitation) reconfiguration of the daemon program, performance tuning of the daemon program, and performance monitoring of the daemon program.

Figure 1B:
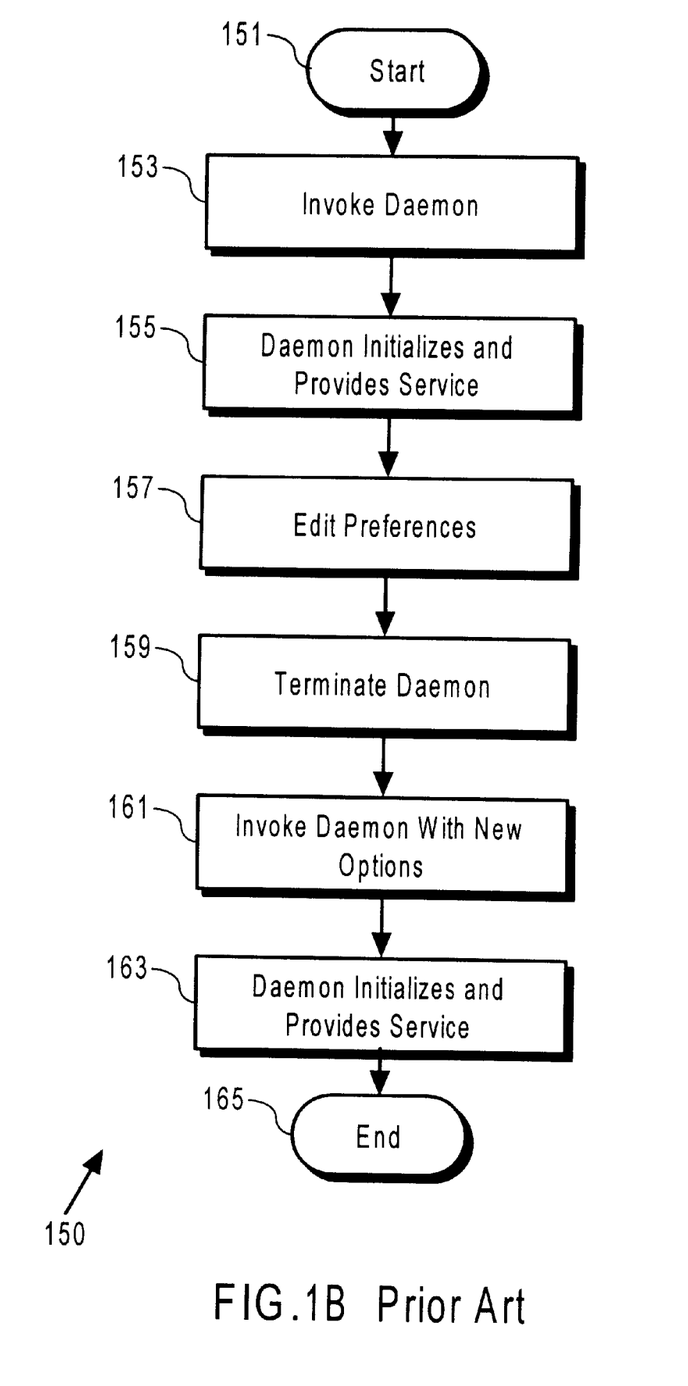
FIG. 1B illustrates a prior art daemon re-initialization process.

FIG. 1B illustrates a prior art daemon re-initialization process, indicated by general reference character 150, used to change the characteristics of a daemon program. The prior art daemon re-initialization process 150 initiates at a 'start' terminal 151 and continues to a 'daemon program invocation' step 153. As was previously described, the daemon program can be invoked by a system administrator who may specify invocation options. Once the daemon program is invoked, it initializes itself (possibly using command line options and/or information contained in a preference file) and provides services at a 'first daemon program execution' step 155. The administrator then decides to change the operation of the daemon program. To do so, the system administrator edits the preference file if required (if the desired changes can be accomplished simply by changing startup options this step is not necessary) at an 'edit preferences' step 157. Next, the system administrator initiates a 'terminate daemon program' step 159 that terminates the daemon program. Once the daemon program terminates, the services for the resources provided by the daemon program are no longer available to client-programs. Next, at a 'daemon program re-invocation' step 161, the system administrator restarts the daemon program using different command line options and/or the preference file edited by the 'edit preferences' step 157. Thus, a 'second daemon program execution' step 163 begins execution using the new options and/or preference file and so operates differently than the 'first daemon program execution' step 155. The prior art daemon re-initialization process 150 completes at an 'end' terminal 165.

Some daemon programs provide services for multiple resources. One example of such a daemon program is an HTTP daemon program. For example, a typical HTTP daemon program supports multiple WWW sites. If the execution of the HTFP server daemon program is terminated to modify a parameter for one of the served WWW sites (for example, by using the process of FIG. 1B), service for all the served WWW sites will be interrupted until the HTTP daemon program is restarted.

These daemon programs need a more efficient mechanism to allow an administrator to control the operation of the daemon programs. For example, a WWW server administrator needs the ability to change access control options, to enable particular domains and to gather data for monitoring the performance of the daemon program. In the prior art, the daemon program generally stores performance and status information in a file. The administrator often needs to terminate the daemon program to get access to all the information in the file.

Thus, one problem is that the administration of daemon programs causes interruptions to the services for resources provided by the daemon programs. This service interruption affects the users of programs served by the daemon programs. This service interruption also generally requires administration of the daemon programs to be performed when the daemon programs are least utilized—generally at times that are inconvenient to the administrator.

It would be advantageous to provide a method, apparatus and program product that allow administration of a daemon program without requiring that the daemon program be completely disabled during the administration process. Such an invention improves the performance of computer systems by reducing the amount of time that services to resources are unavailable because of administrative functions.

SUMMARY OF THE INVENTION

The present invention improves the administration of daemon programs by providing a mechanism to perform administrative functions on the daemon programs without terminating the services provided by the daemon programs to the serviced resources.

One aspect of the invention is a computer controlled method for dynamically performing a control operation on a daemon program. The daemon program provides a service for one or more resources. The method includes the step of registering the daemon program with an inter-process communication mechanism. Another step is that of connecting a service agent program to the daemon program using the inter-process communication mechanism. The method also sends a message from the service agent program to the daemon program using the inter-process communication mechanism. Yet another step is that of processing the message by the daemon program performing the control operation.

Another aspect of the invention is an apparatus, having a central processing unit (CPU) and a memory coupled to the CPU, for dynamically performing a control operation on a daemon program. The daemon program provides a service for a one or more resources. The apparatus includes a registration mechanism that is configured to register the daemon program with an inter-process communication mechanism. It also includes a connection mechanism that is configured to connect the service agent program to the daemon program using the inter-process communication mechanism. The apparatus also includes a message mechanism that is configured to send a message from the service agent program to the daemon program using the inter-process communication mechanism. In addition, the apparatus includes a processing mechanism that is configured to process the message by the daemon program.

Yet a further aspect of the invention is a computer program product embodied on a computer usable medium for causing a computer to dynamically perform a control operation on a daemon program. The daemon program provides a service for one or more resources. When executed on a computer, the computer readable code causes a computer to effect a registration mechanism, a connection mechanism, a message mechanism and a processing mechanism. Each of these mechanisms having the same functions as the corresponding mechanisms for the previously described apparatus.

An additional aspect of the invention is computer program product embodied in a carrier wave. The carrier wave transmits computer readable code therein for causing a computer to dynamically perform a control operation on a daemon program. The daemon program provides a service for one or more resources. When executed on a computer, the computer readable code causes a computer to effect a registration mechanism, a connection mechanism, a message mechanism and a processing mechanism. Each of these mechanisms having the same functions as the corresponding mechanisms for the previously described apparatus.

The foregoing and many other aspects of the present invention will no doubt become obvious to those of ordinary skill in the art after having read the following detailed description of the preferred embodiments that are illustrated in the various drawing figures.

DESCRIPTION OF THE PREFERRED EMBODIMENTS

Notations and Nomenclature

The following 'notations and nomenclature' are provided to assist in the understanding of the present invention and the preferred embodiments thereof.

Control operation—A control operation is any operation that is ancillary to the main function of the daemon program. A control operation includes (without limitation) an administrative operation, a configuration operation, a status operation, and a performance monitoring operation. The control operation may be directed toward the daemon program or one or more of the resources served by the daemon program.

Daemon program—A daemon program is a program that runs continuously and automatically in the background (*Wired Style; Principles of English Usage in the Digital Age*, © 1996 by HardWired, page 44, ISBN 1-888869-01-1). Another definition is a process that performs a utility function without user interaction (*Inside OS/2*, © 1988 Microsoft Press, page 270, ISBN 1-55615-117-9). Most UNIX-like systems have daemon programs that provide print services, remote file services, and Internet services along with many other services. Similar functionality is provided (often using a different terminology) by other operating systems.

Procedure—A procedure is a self-consistent sequence of steps leading to a desired result. These steps are those requiring physical manipulation of physical quantities. Usually these quantities take the, form of electrical or magnetic signals capable of being stored, transferred, combined, compared, and otherwise manipulated. These signals are referred to as bits, values, elements, symbols, characters, terms, numbers, or the like. It will be understood by those skilled in the art that all of these and similar terms are associated with the appropriate physical quantities and are merely convenient labels applied to these quantities.

Operating Environment

Figure 2:
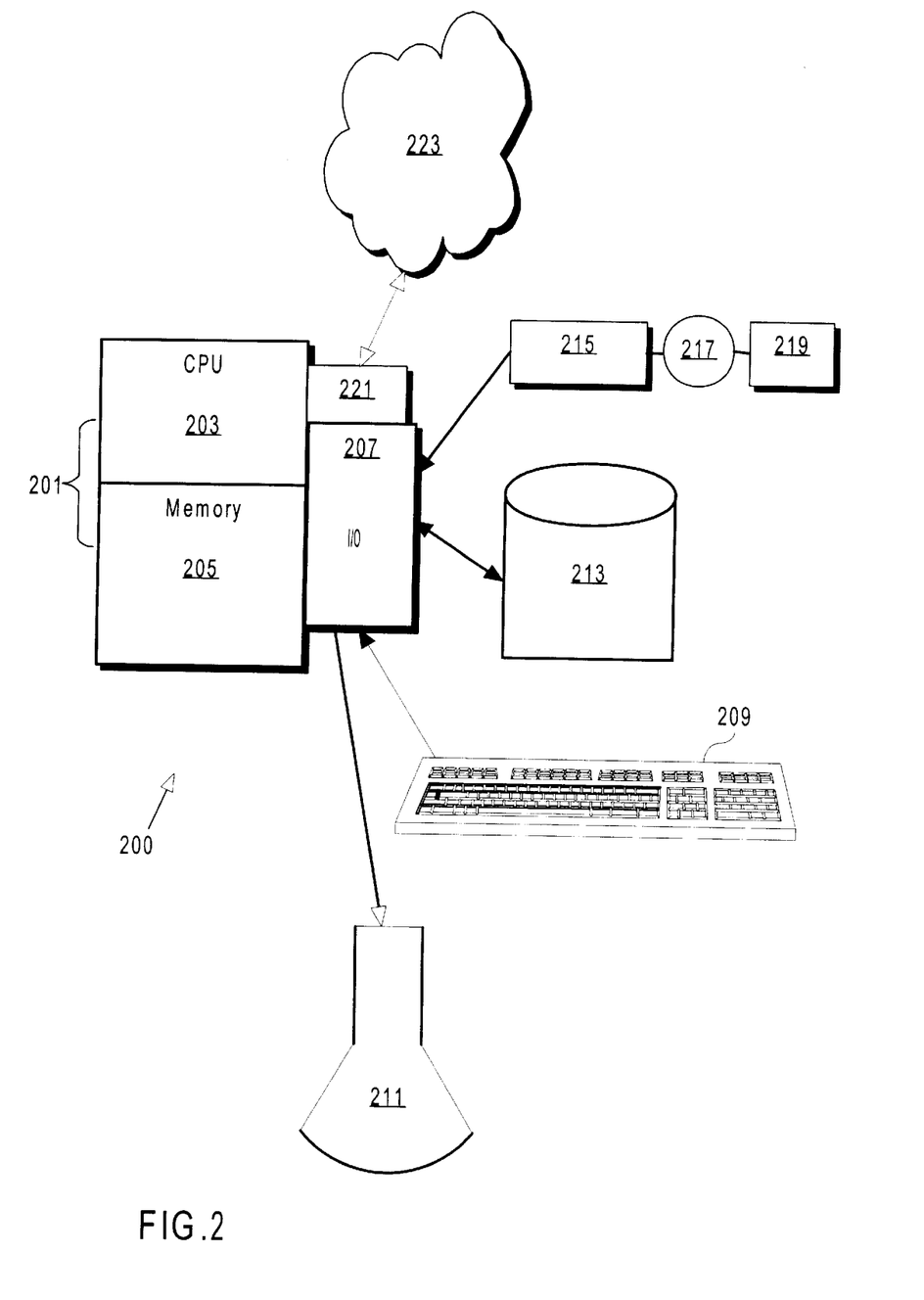
FIG. 2 illustrates a computer system capable of using the invention in accordance with a preferred embodiment.

The invention uses a computer. Some of the elements of a computer, as indicated by general reference character 200, configured to support the invention are shown in FIG. 2 wherein a processor 201 is shown, having a central processor unit (CPU) 203, a memory section 205 and an input/output (I/O) section 207. The I/O section 207 is connected to a keyboard 209, a display unit 211, a disk storage unit 213 and a CD-ROM drive unit 215. The CD-ROM drive unit 215 can read a CD-ROM medium 217 that typically contains a program and data 219. The CD-ROM drive unit 215, along with the CD-ROM medium 217 and the disk storage unit 213 comprise a filestorage mechanism. The computer system also includes a network interface 221 that connects the computer system to a network 223. Such a computer system is capable of executing applications that embody the invention. One skilled in the art will understand that the network can be used to communicate between separate programs within the same computer using network-based mechanisms. Thus, the communication between programs within the computer system need not actually extend outside of the computer system over the network 223. One skilled in the art will understand that some embodiments of the invention can be implemented on a computer having only a subset of the above capabilities.

Figure 3:
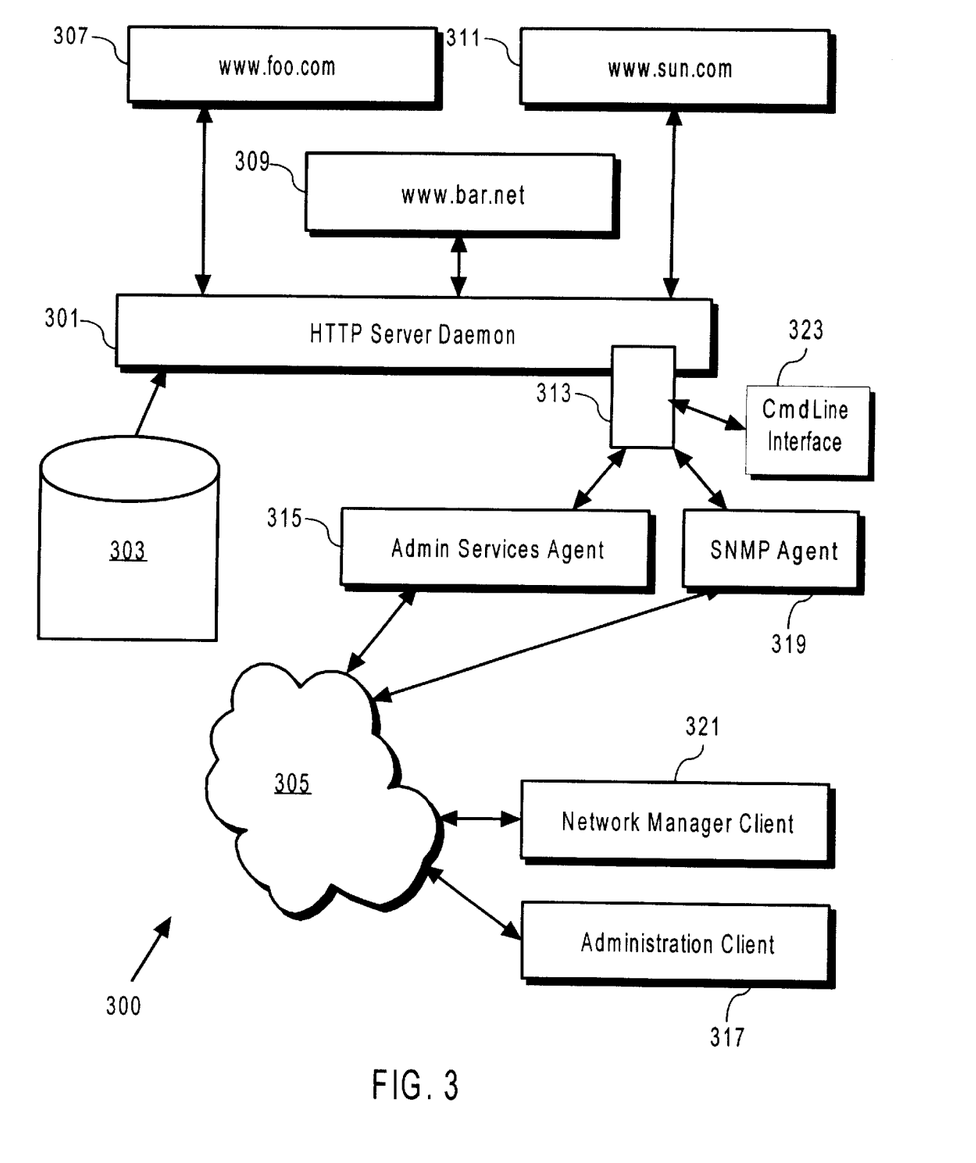
FIG. 3 illustrates daemon program architecture in accordance with a preferred embodiment.

A preferred embodiment, shown in FIG. 3, illustrates a daemon program architecture, indicated by general reference character 300, which incorporates the invention with an HTTP server daemon program 301. On initialization, the HTTP server daemon program 301 accesses a preference file 303 to obtain its startup configuration (possibly in conjunction with command line options). The HTTP server daemon program 301 binds to a network 305 and provides concurrent HTTP services to resources such as a first served web site 307, a second served web site 309, and a third served web site 311. The HTTP server daemon program 301 also includes an inter-process communication mechanism 313 that allows an agent program to communicate to the HTTP server daemon program 301. An 'administrative services agent' program 315 communicates over the network 305 to an 'administration client' program 317. The 'administration client' program 317 sends requests for administrative operations to the 'administrative services agent' program 315 that then performs the requested operation. To perform the requested operation, the 'administrative services agent' program 315 may change the preference file 303 or communicate with the HTTP server daemon program 301 using the inter-process communication mechanism 313. If the 'administrative services agent' program 315 communicated to the HTTP server daemon program 301, the HTTP server daemon program 301 performs the requested operation and acknowledges the status of the completion of the requested operation to the 'administrative services agent' program 315 (possibly returning other information). This information is then returned to the 'administration client' program 317. A similar process occurs using a 'SNMP agent' program 319. However, in this case a 'network manager service' program 321 communicates over the network 305 using the SNMP protocol to the 'SNMP agent' program 319, which then communicates to the HTTP server daemon program 301 to perform the requested operation. In addition, a 'command line interface' program 323 may connect to the HTTP server daemon program 301 using the inter-process communication mechanism 313. The 'command line interface' program 323 allows textual commands to be sent to the HTTP server daemon program 301 as required.

One advantage of the daemon program architecture 300 is that the HTTP server daemon program 301 can receive, process, and respond to, commands through the inter-process communication mechanism 313. Thus, the 'administrative services agent' program 315 can reconfigure the preference file 303 (for example modifying parameters for the first served web site 307) and then communicate with the HTTP server daemon program 301 to restart service for the first served web site 307 using the new parameters. Thus, the HTTP server daemon program 301 can modify the first served web site 307 without interrupting service to the second served web site 309. This allows a network administrator to selectively enable or disable services for a particular domain without affecting services provided to other domains.

In addition, the HTTP server daemon program 301 can provide status information to the 'administration client' program 317 in a similar manner. The 'administration client' program 317 sends a status request over the network 305 to the 'administrative services agent' program 315. The 'administrative services agent' program 315 converts the request to one or more communications, using the inter-process communication mechanism 313, to the HTTP server daemon program 301. The HTTP server daemon program 301 processes and responds to these communications to provide status information to the 'administrative services agent' program 315. The 'administrative services agent' program 315 then assembles the returned information and sends the assembled data to the 'administration client' program 317.

One skilled in the art will understand that daemon programs that provide services other than HTTP services also benefit from the invention. Examples (without limitation) of such daemon programs include an FTP daemon, an e-mail daemon, a Usenet news daemon, a system log daemon, a directory services daemon and an Internet standard services daemon. One skilled in the art will understand that daemon programs other then those listed will also benefit from the invention.

The inter-process communication mechanism 313 used by the invention can be based on any inter-process communication mechanism. These mechanisms include inter-process communication (IPC) mechanisms such as (without limitation) Solaris™ Doors, pipes, semaphores, shared memory, queues, signals, and mailboxes, and message queues. These mechanisms also include (without limitation) remote procedure call (RPC) mechanisms, TCP/IP mechanisms, and remote method invocation (RMI) mechanisms. One skilled in the art will understand that many mechanisms exist to pass information between programs executing within a computer. The invention contemplates the use of any such inter-process communication mechanism that can provide the capability for a service agent program to access the server program. A preferred embodiment of the inter-process communication mechanism provides security such that only a known trusted service agent program may access the daemon program. A preferred embodiment uses the Solaris Doors mechanism.

The 'administrative services agent' program 315 and the 'SNMP agent' program 319 are each an example of a service agent program. The service agent program provides an interface between the network 305 and a daemon program such as the HTTP server daemon program 301 for administrative services. Each service agent program makes a trusted connection with the daemon program. Each service agent program also makes itself available as a service over the network. The service agent program receives commands from a networked program and performs the appropriate communications to the daemon program to satisfy the command. The results are returned to the service agent program from the daemon program that, in turn, sends the results back to the networked program that initiated the request. Example service agent programs include (without limitation) a SNMP agent, an FTP administration agent, and a WWW server administration agent. The invention contemplates the use of service agent programs other than those just listed.

One skilled in the art will understand that many techniques exist for programs to communicate over a network. These techniques include well known TCP/IP protocols or HTTP protocols. Such a one will also understand that WWW page services generally use an HTTP daemon program to process the HTTP protocols. Thus, if the service agent program is serviced by the HTTP server daemon program 301 the data flow indicated in the example illustrated by FIG. 3 is modified so that commands from the client programs first pass through the HTTP server daemon program 301.

Figure 4:
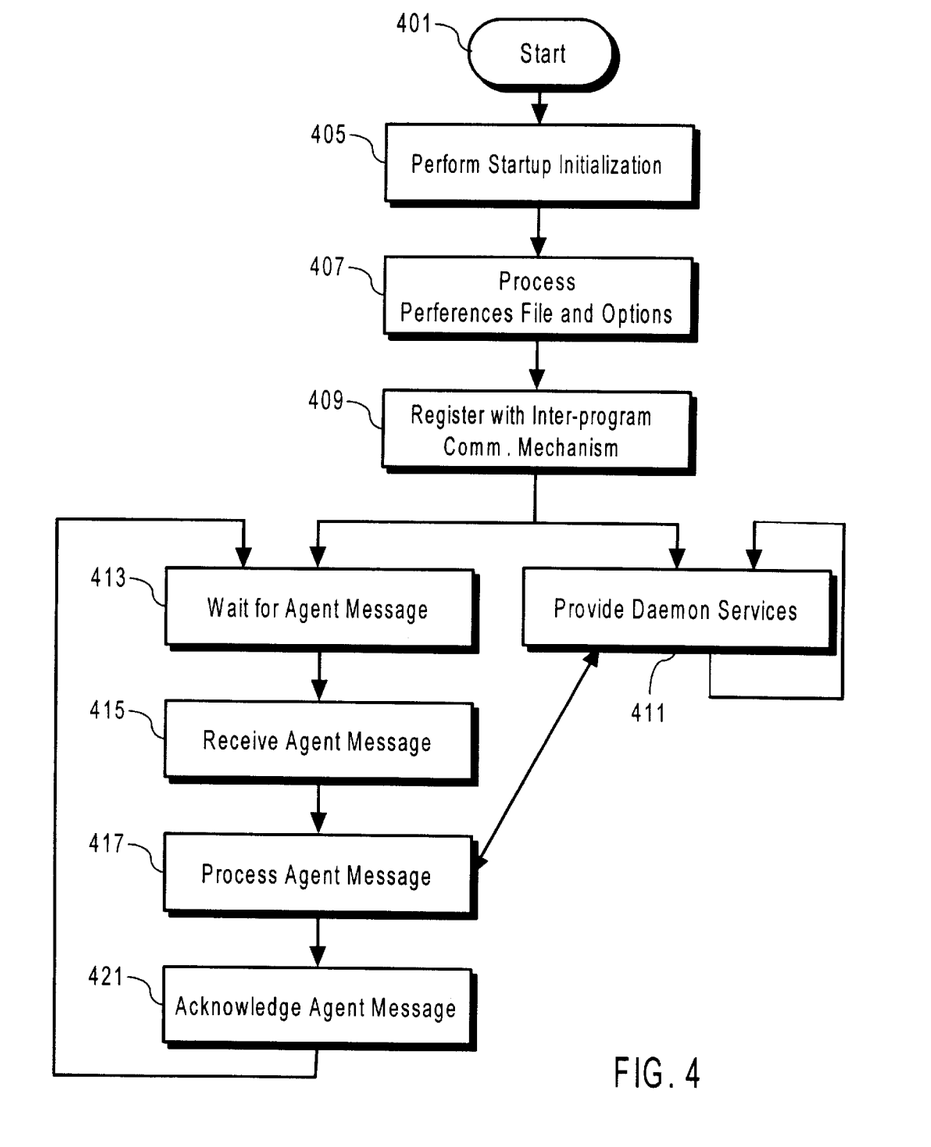
FIG. 4 illustrates the operation of a daemon program in accordance with a preferred embodiment.

FIG. 4 illustrates a daemon program process, indicated by general reference character 400, for providing services to resources. The daemon program process 400 is generally invoked as a result of an operator inputting an explicit command to the computer system, as a result of an automatic invocation from the system's initialization process or as a result of a timer event. The invocation of the daemon program may include processing command line options that specify various operational parameters to the daemon program. The daemon program process 400 initiates at a 'start' terminal 401 and continues to a 'daemon initialization' procedure 405. The 'daemon initialization' procedure 405 generally performs, for example, storage initialization, creation of additional threads-of-execution and other initialization operations that are well understood by the art. Next, the daemon program continues to a 'process preferences' procedure 407 that reads and processes the contents of the preference file 303 and processes any command line options. The preference file 303 contains information that allows the daemon program to reconfigure itself to the same condition as when the daemon program last terminated. For the HTTP server daemon program 301, the preference file 303 contains information that identifies the web sites 307, 309, 311 that are the resources serviced by the daemon program.

Then, the daemon program process 400 continues to a 'register with inter-process communication mechanism' procedure 409 that enables future communication from at least one service agent program, (for example, the 'administrative services agent' program 315) through the inter-process communication mechanism 313. The 'register with inter-process communication mechanism' procedure 409 depends on the details of the inter-process communication mechanism 313 implementation. The registration process generally includes: registering server program identification information; specifying security options (to limit communications to the server program by trusted service agent programs); and performing other operations to ready the daemon program for receiving communications from a service agent program.

The daemon program process 400 (in a preferred embodiment) then creates another thread-of-execution so that one thread-of-execution is used to support a 'provide daemon services' procedure 411 that provides the services to resources supported by the daemon program. The 'provide daemon services' procedure 411 may itself spawn additional threads as required to provide the daemon program's services. The other thread-of-execution is used to process requests from each service agent program. One skilled in the art will understand how to use threads-of-execution to perform multiple operations within the same program. A 'wait for agent message' procedure 413 waits for a command to be received by the inter-process communication mechanism 313. When a command is received, the process continues to a 'receive agent message' procedure 415. In a preferred embodiment, another thread is spawned to process the command by a 'program agent message' procedure 417. The 'program agent message' procedure 417 uses an 'inter-thread communication' mechanism 419 to affect execution of the 'provide daemon services' procedure 411 responsive to the received messages. The 'inter-thread communication' mechanism 419 may use thread mutexs, condition variables or other well-known techniques to obtain information from, and perform administrative operations on, the 'provide daemon services' procedure 411. Once the requested operation is completed, an 'acknowledge agent message' procedure 421 acknowledges to the appropriate service agent program that the command was completed, the status of the command completion and any additional data required by the service agent program. The program then ends the execution of the thread and returns to the 'wait for agent message' procedure 413 to receive the next command.

Figure 5:
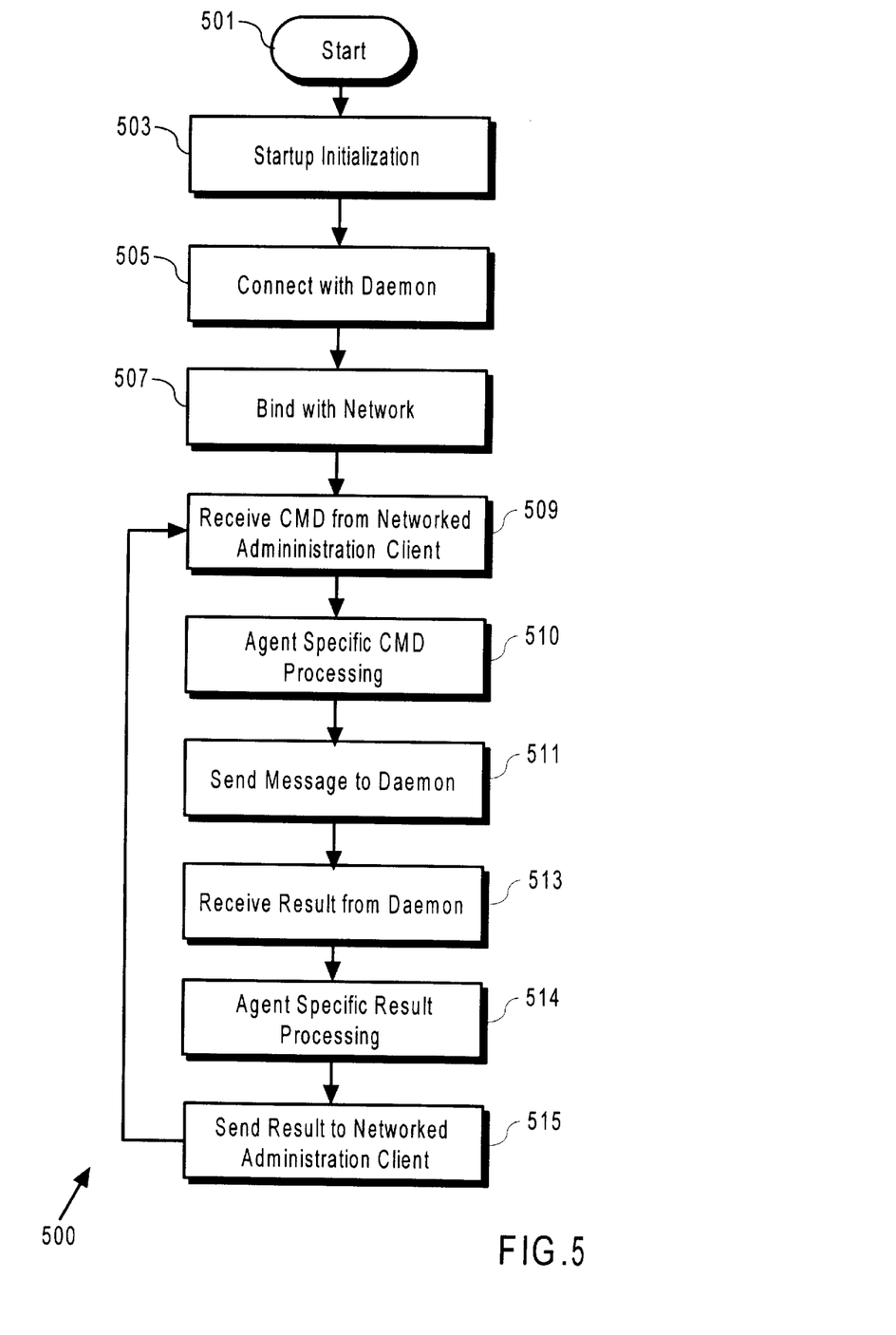
FIG. 5 illustrates the operation of an agent program in accordance with a preferred embodiment.

FIG. 5 illustrates an 'agent execution' process, indicated by general reference character 500, for connecting a networked application to the daemon program. The process 500 is generally initiated by an operator inputting an explicit command to the computer system, an automatic invocation from the system's initialization process or because of a timer event.

This process is implemented by both the 'administrative services agent' program 315 and the 'SNMP agent' program 319. The invocation of the process 500 may include processing command line options that specify various conditions to the agent program. Once invoked, the process 500 initiates at a 'start' terminal 501 and continues to a 'startup initialization' procedure 503 that initializes the agent program. Next, the process 500 continues to a 'connect with daemon' procedure 505 that accesses the inter-process communication mechanism 313 to determine whether the desired daemon program has registered (see the 'register with inter-process communication mechanism' procedure 409). If the desired daemon program has not registered, the agent program may retry after some delay or provide an error indication. However, if the desired daemon program has registered, the service agent program opens a connection with the daemon program using the inter-process communication mechanism 313.

Next, the process 500 continues to a 'bind with network' procedure 507 that establishes the presence of the service agent program on the network. The 'bind with network' procedure 507 uses well-known techniques to register with the network protocols. For example, with a TCP/IP network, the program may be associated with a specific URL, or have a known TCP/IP socket and port.

At this point, the service agent program has completed initialization and waits to receive a command. Eventually, at a 'receive CMD from networked administration client' procedure 509, the process 500 receives a command from the network. The process 500 parses and processes the command at an 'agent specific CMD processing' procedure 510. Then the process 500 generates and sends an appropriate message or sequence of messages specifying a control operation to the daemon program at a 'send control operation to daemon' procedure 511 to effectuate the command. The daemon program responds by processing the message and performing the specified control operation and returns a result and (if required) data. The control operation may be directed toward the daemon program itself or one or more of the resources controlled by the daemon program. Some example control operations are (without limitation) those that cause the daemon program to re-initialize, suspend service of a resource, provide performance information and other useful operations as may be desired. Eventually, the daemon program performs the requested operation and returns a result to the process 500 at a 'receive result from daemon' procedure 513. Once the process 500 receives information from the daemon program, an 'agent specific result processing' procedure 514 processes the results according to the specifications of the service agent program. Then a 'send results to networked administration client' procedure 515 sends the results to the network client.

Figure 6A:
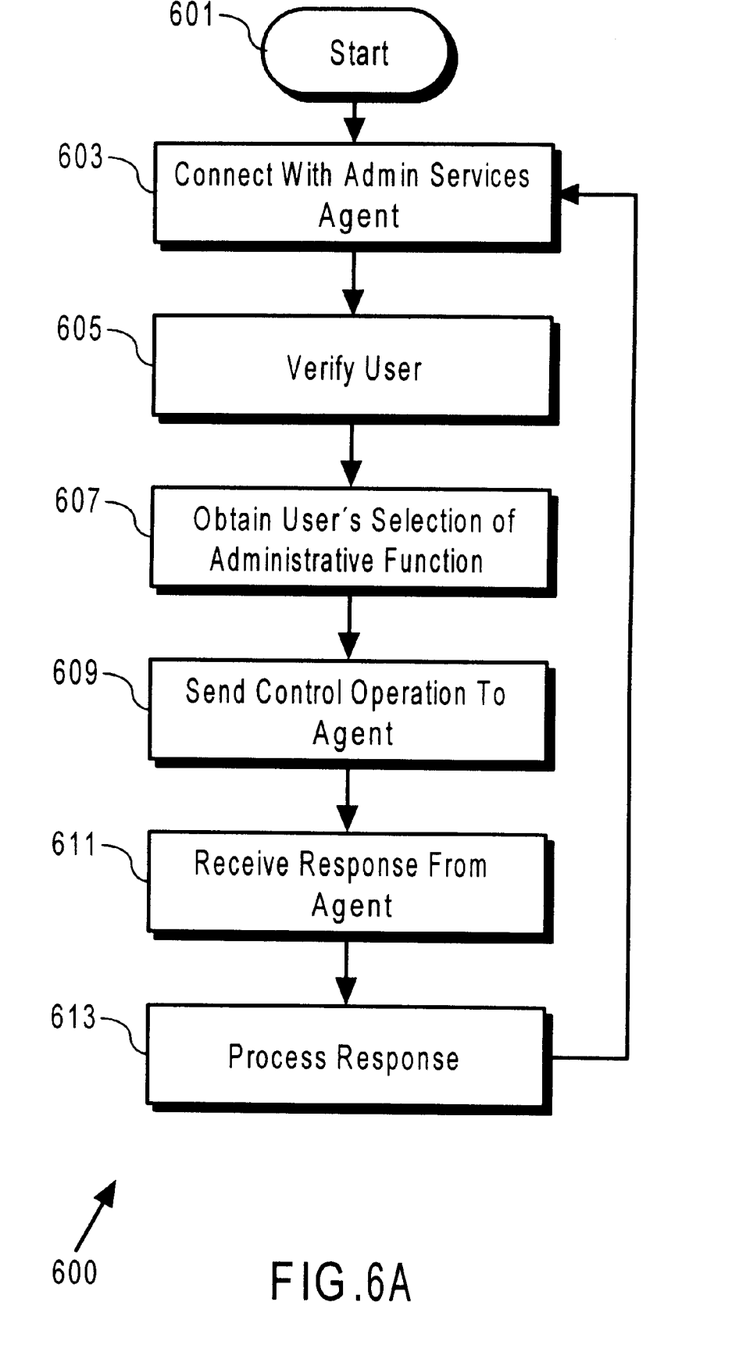
FIG. 6A illustrates the operation of an administrative-services client program in accordance with a preferred embodiment.

FIG. 6A illustrates an 'administrative-services client' process, indicated by general reference character 600 that communicates with the 'administrative services agent' program 315 that implements the process 500 shown in FIG. 5 to allow a trusted user to perform administrative functions on the daemon program. The 'administrative-services client' process 600 is generally implemented by the 'administration client' program 317. The 'administrative-services client' process 600 initiates at a 'start' terminal 601 and continues to a 'connect with admin. services agent' procedure 603 that uses a network protocol (for example, TCP/IP) to establish a connection with the 'administrative services agent' program 315. Once the connection is established, the 'administrative services agent' program 315 verifies that the user is a trusted user at a 'verify user' procedure 605. Once the user is verified as a trusted user, the 'administrative-services client' process 600 continues to an 'obtain selected administrative function' procedure 607 that presents the user with a selection of functions. The user selects a function that specifies a control operation. This control operation is then submitted to the 'administrative services agent' program 315 where it is processed in accordance with the process 500 shown in FIG. 5. Eventually, the 'administrative-services client' process 600 receives a response from the 'administrative services agent' program 315 at a 'receive response from agent' procedure 611. This response is processed by a 'process response' procedure 613. The processed response generally indicates to the trusted user that the desired function has completed. The 'process response' procedure 613 also displays to the user any information returned by the 'administrative services agent' program 315. Then the 'administrative-services client' process 600 continues back to the 'connect with admin. services agent' procedure 603 to perform additional functions.

Figure 6B:
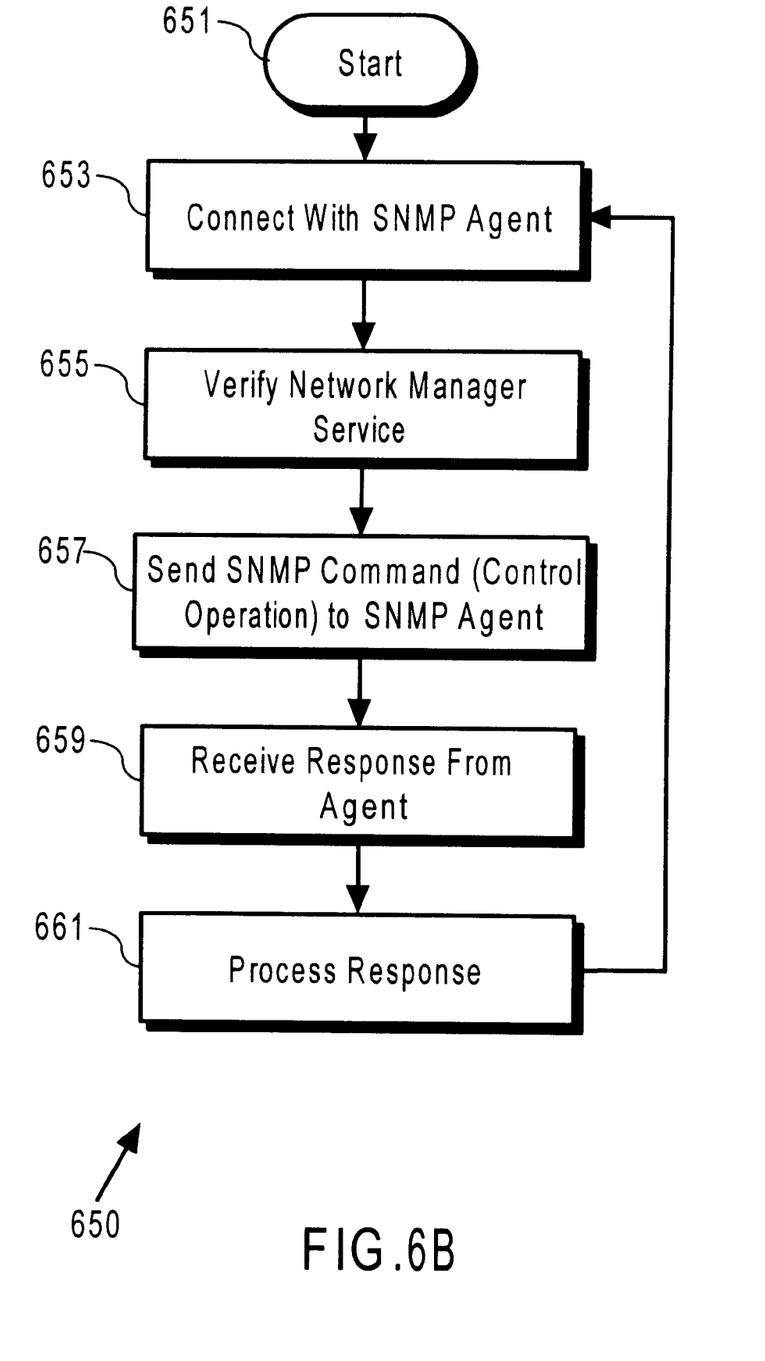
FIG. 6B illustrates the operation of a network manager programs in accordance with a preferred embodiment.

FIG. 6B illustrates a 'network manager service client' process, indicated by general reference character 650, that communicates with the 'SNMP agent' program 319 that implements the process 500 shown in FIG. 5 to allow the 'network manager service client' process 650 to obtain information from the daemon program. The 'network manager service client' process 650 initiates at a 'start' terminal 651 and continues to a 'connect with SNMP agent' procedure 653. The 'connect with SNMP agent' procedure 653 connects with the 'SNMP agent' program 319. Then, the 'network manager service client' process 650 continues to a 'verify network management service' procedure 655 that cooperates with the 'SNMP agent' program 319 to determine whether the 'network manager service' program 321 is trusted by the 'SNMP agent' program 319. If the 'SNMP agent' program 319 does not trust the 'network manager service' program 321, the 'network manager service client' process 650 indicates an error condition. Otherwise the 'network manager service client' process 650 continues to a send SNMP command (control operation)' procedure 657 that uses the SNMP protocol to send a network management request to the 'SNMP agent' program 319. The 'SNMP agent' program 319 processes the network management request and generates messages to the daemon program as discussed with respect to FIG. 5. The 'SNMP agent' program 319 also sends a status response and possibly results back to the 'network manager service' program 321. This response is received at a 'receive response from agent' procedure 659. Then the 'network manager service client' process 650 operates on the response at a 'process response' procedure 661 as is appropriate. The 'network manager service client' process 650 then continues to the 'connect with SNMP agent' procedure 653 to submit additional SNMP requests to the 'SNMP agent' program 319.

Library Functions

Examples of library functions that use the Solaris Doors facility to communicate between the agents and the daemon program are now provided.

TABLE 1

```
int
httpd_call_instance(
     char          *inst_name,
     door_cmd_t    *cmd,
     door_res_t    **res_p,
     int           *rsize_p
)
```

The core function that passes information to or from the HTTP daemon program is shown in Table 1. This function invokes a door call to the daemon program from the service agent program. The inst_name argument is used to pass the name of the door registered by the daemon program. The cmd argument is used to pass a command code to the daemon program that instructs the daemon program to perform an administrative or command function. The res_p argument receives a pointer to the buffer allocated by the daemon program (if any) that is used to return result data. The rsize_p argument receives the size of the allocated buffer.

TABLE 2

```
int
httpd_restart_instance (char *inst_name)
{
    int           retval, rsize;
    door_cmd_t    cmd;
    door_res_t    *res;
    cmd.cmdName = TPD_RESTARTINST;
    retval = httpd_call_instance(
        inst_name, &cmd, &res, &rsize);
    ...
    return (retval >=0 ? SUCCESS : DOORFAILED);
}
```

The HTTP daemon program can be restarted using code shown in Table 2. Here the cmd.cmdname is set to TPD_RESTARTINST. The inst_name argument is used to pass the name of the door registered by the daemon program. When the httpd_call_instance is invoked, the command is sent to the daemon program causing the daemon program terminate services to the served resources. That is, the HTTP daemon program stops serving the WWW domains, reinitializes itself according to the preference file and resumes services to the served resources. Once the HTTP daemon program completes the restart operation, it sends a status result back to the invoking program.

The HTTP daemon program can be instructed to update its access control configuration as shown in Table 3. The inst_name argument is used to provide the name of the door registered by the daemon program. In addition, the domain name (for example, the string "www.sun.com" used to identify the first served web site 307) is used to identify which resource (WWW domain) is to be reloaded. The acl_file string specifies which access control file is to be used to initialize the web site. Thus, this calling sequence is used to reinitialize a specified web site using a specified access control file.

TABLE 3

```
int
httpd_reload_acl (
    char    *inst_name,
    char    *host_name,
    char    *acl_file
    )
{
    ...
    cmd.cmdName = TPD_RELOAD_ACL;
    strcpy (cmd.aclcmd.host_name, host_name);
    strcpy (cmd.aclcmd.acl_file, acl_file);
    retval = httpd_call_instance(
        inst_name, &cmd, &res, &rsize);
    ...
    return (retval >- 0 ? SUCCESS :DOORFAILED)
}
```

The HTTP daemon program can be instructed to provide dynamic statistics from the web server as shown in Table 4. Again, the inst_name argument is used to provide the name of the door registered by the daemon program. The stats argument is a pointer that will be used to access the status information returned from the daemon program.

One skilled in the art will understand that the invention provides techniques for

TABLE 4

```
int
do_get_server_stats (
    char           *inst_name,
    htstates_inst_t *stats,
    )
{
    ...
    cmd.cmdName = TPD_GET_INST_STATS;
    rbuf = (char *) &res; rsize = sizeof(res);
    retval = httpd_call_instance(
        inst_name, &cmd, &res, &rsize);
    ...
    return (retval >- 0 ? SUCCESS :DOORFAILED)
}
``` dynamic administration, management and monitoring of daemon programs executing within a computer.

From the foregoing, it will be appreciated that the invention has (without limitation) the following advantages:

1) The invention allows administrators to dynamically configure executing daemon programs. For example, an administrator of a WWW server can reconfigure one web domain without effecting the other domains served by the HTTP daemon program.

2) The invention also provides a daemon architecture that allows acquisition of administrative data (such as performance data) from the daemon program while the daemon program executes.

Although the present invention has been described in terms of the presently preferred embodiments, one skilled in the art will understand that various modifications and alterations may be made without departing from the scope of the invention. Accordingly, the scope of the invention is not to be limited to the particular invention embodiments discussed herein, but should be defined only by the appended claims and equivalents thereof.

What is claimed is:

1. A computer controlled method for dynamically performing a control operation on a daemon program that provides a service for two or more resources, the method comprising:

(a) registering the daemon program with an inter-process communications mechanism, and using the inter-process communication-mechanism to connect the daemon program to a service agent program which interfaces with one or more client programs or command line interfaces from which a request for a control operation initiates;

(b) sending a message including the request for the control operation from the service agent program to the daemon program using the inter-process communication mechanism; and (c) causing the daemon program to
communicate with a preferences mechanism which contains at least one parameter for each of a first resource and a second resource associated with the daemon program, and
implement, in response to the request for a control operation, at least one new parameter or a change of at least one parameter in the preferences mechanism used by the daemon program to serve a selected one of the first resource and the second resource,
wherein termination of the daemon program is not required to serve the selected one of the first and the second resource according to the new or changed parameter; and
wherein interruption of a service being performed concurrently for the other of the first resource and the second resource is not required.

2. The computer controlled method of claim 1, comprising:
enabling said inter-process communication mechanism within said daemon program.

3. The computer controlled method of claim 1, wherein said control operation is selected from the group consisting of an administration function, a performance monitoring function, a configuration function and a status producing function.

4. The computer controlled method of claim 1, wherein said daemon program is selected from the group consisting of an FTP daemon, a mail daemon, a usenet news daemon, an HTTP daemon, a system log daemon, a directory services daemon and an internet standard services daemon.

5. The computer controlled method of claim 1, where said service agent program is selected from the group consisting of an SNMP agent, an FTP administration agent, and a WWW server administration agent.

6. The computer controlled method of claim 1, wherein said inter-process communication mechanism is selected from the group consisting of Solaris Doors, pipes, semaphores, shared memory, queues, mailboxes, remote procedure call RPC), and remote method invocation (RMI).

7. The computer controlled method of claim 1, where said control operation is directed toward said daemon program.

8. The computer controlled method of claim 7, wherein said control aeration is directed toward at least one of said one or more resources.

9. The computer controlled method of claim 1, wherein the request for the control operation includes a request to reinitialize a selected one of the first resource and the second resources by specifying an access control file to be used to reinitialize the selected resource, and wherein the step of causing the daemon program to implement is performed according to the request to reinitialize.

10. The computer controlled method of claim 1, wherein the request for the control operation includes a request to provide statistics about the performance of the computer, and wherein the step of causing the daemon program to implement is performed according to the request to provide statistics.

11. An apparatus having a central processing unit (CPU) and a memory coupled to said CPU for dynamically performing a control operation on a daemon program, wherein the daemon program provides a service for one or more resources, and said apparatus comprises:

a preferences mechanism, which communicates with the daemon program, which contains at least one parameter for each of a first resource and a second resource associated with the daemon program;

a registration mechanism for an inter-process communication mechanism, which connects the daemon program to a service agent program, where the service agent program interfaces with one or more client programs or command line interfaces from which a request for a control operation initiates;

a message mechanism configured to send a message including the request for the control operation from the service agent program to the daemon program using the inter-process communication mechanism; and a message processing mechanism, at the daemon program, configured to process the message received by the daemon program and to perform a control operation for at least one selected service for at least one of the first resource and the second resource by implementing, in response to the request for a control operation, at least one new parameter or a change of at least one parameter in the preferences mechanism used by the daemon program to serve a selected one of the first resource and the second resource, wherein termination of the daemon program is not required to serve the selected one of the first and the second resource according to the new or changed parameter; and wherein interruption of a service being performed concurrently for the other of the first resource and the second resource is not required.

12. The apparatus of claim 1, wherein said registration mechanism further comprises:

a communication setup mechanism configured to enable said inter-process communication mechanism within said daemon process.

13. The apparatus of claim 11, wherein said control operation is selected from the group consisting of an administration function, a performance monitoring function, a configuration function and a status producing function.

14. The apparatus of claim 11, wherein said daemon process is selected from the group consisting of an FTP daemon, a mail daemon, a usenet news daemon, an HTTP daemon, a system log daemon, a directory services daemon and an internet standard services daemon.

15. The apparatus of claim 11, wherein said daemon program is selected from the group consisting of an SNMP agent, an FTP administration agent, and a WWW server administration agent.

16. The apparatus of claim 11, wherein said inter-process communication mechanism is selected from the group consisting of Solaris Doors, pipes, semaphores, shared memory, queues, mailboxes, remote procedure call (RPC), and remote method invocation (RMI).

17. The apparatus of claim 11, wherein said control operation is directed toward said daemon program.

18. The apparatus of claim 11, wherein said control operation is directed toward at least one of said one or more resources.

19. The apparatus of claim 11, wherein the request for the control operation includes a request to reinitialize a selected one of the first resource and the second resources by specifying an access control file to be used to reinitialize the selected resource, and wherein the message processing mechanism is configured to perform the control operation according to the request to reinitialize.

20. The apparatus of claim 11, wherein the request for the control operation includes a request to provide statistics about the performance of the apparatus, and wherein the message processing mechanism is configured to perform the control operation according to the request provide statistics.

21. A computer program product comprising:

a computer usable storage medium having computer readable code embodied therein for causing a computer to dynamically perform a control operation on a daemon program, wherein the daemon program provides a service for one or more resources, the computer readable code comprising:

computer readable program code configured to cause the computer to communicate with a preferences mechanism for the daemon program, where the preferences mechanism contains at least one parameter for each of a first resource and a second resource associated with the daemon program;

computer readable program code configured to cause the computer to effect an inter-process communication mechanism configured to connect the daemon program to a service agent program, which interfaces with one or more client programs or command line interfaces from which a request for a control operation initiates;

computer readable program code configured to send a message including the request for the control operation from the service agent program to the daemon program using the inter-process communication mechanism; and computer readable program code configured to process the message received by the daemon program and to perform a control operation for at least one selected service for at least one of the first resource and the second resource by implementing, in response to the request for a control operation, at least one new parameter or a change of at least one parameter in the preferences mechanism used by the daemon program to serve a selected one of the first resource and the second resource, wherein termination of the daemon program is not required to serve the selected one of the first and the second resource according to the new or changed parameter; and wherein interruption of a service being performed concurrently for the other of the first resource and the second resource is not required.

22. The computer program product of claim 21 wherein said registration mechanism further comprises:

computer readable program code configured to cause said computer to cause said computer to effect a communication setup mechanism configured to enable said inter-process communication mechanism within said daemon process.

23. The computer program product of claim 21, wherein said control operation is selected from the group consisting of an administration function, a performance monitoring function, a configuration function and a status producing function.

24. The computer program product of claim 21, wherein said daemon program is selected from the group consisting of an FTP daemon, a mail daemon, a usenet news daemon, an HTTP daemon, a system log daemon, a directory services daemon and an internet standard services daemon.

25. The computer program product of claim 21, wherein said service agent program is selected from the group consisting of an SNMP agent, an FTP administration agent and a WWW server administration agent.

26. The computer program product of claim 21, wherein said inter-process communication mechanism is selected from the group consisting of Solaris Doors, pipes, semaphores, shared memory, queues, signals mailboxes, remote procedure call (RPC), and remote product invocation (RMI).

27. The computer program product of claim 21, wherein said control operation is directed toward said daemon program.

28. The computer program product of claim 21, wherein said control operation is directed toward at least one of said resources.

29. The computer program product of claim 21, wherein the request for the control operation includes a request to reinitialize a selected one of the first resource and the second resources by specifying an access control file to be used to reinitialize the selected resource, and wherein the computer readable program code is configured to perform the control operation according to the request to reinitialize.

30. The computer program product of claim 21, wherein the request for the control operation includes a request to provide statistics about the performance of the computer, and wherein the computer readable program code is configured to perform the control operation according to the request provide statistics.

* * * * *

UNITED STATES PATENT AND TRADEMARK OFFICE
CERTIFICATE OF CORRECTION

PATENT NO. : 6,457,063 B1
DATED : September 24, 2002
INVENTOR(S) : Chintalapati et al.

It is certified that error appears in the above-identified patent and that said Letters Patent is hereby corrected as shown below:

Column 12,
Line 49, replace "RPC)" with -- (RPC) --.

Column 13,
Line 39, replace "claim 1" with -- claim 11 --.

Signed and Sealed this

Fourth Day of February, 2003

JAMES E. ROGAN
*Director of the United States Patent and Trademark Office*